US007756890B2

(12) United States Patent
Carter (10) Patent No.: US 7,756,890 B2
(45) Date of Patent: Jul. 13, 2010

(54) SEMANTIC IDENTITIES

(75) Inventor: Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 282 days.

(21) Appl. No.: 11/261,976

(22) Filed: Oct. 28, 2005

(65) Prior Publication Data

US 2007/0100835 A1  May 3, 2007

(51) Int. Cl.
G06F 7/00 (2006.01)
G06F 17/30 (2006.01)

(52) U.S. Cl. .................................. 707/776; 707/784
(58) Field of Classification Search .................. 706/14; 726/1, 2, 5; 707/10, 104.1
See application file for complete search history.

(56) References Cited

U.S. PATENT DOCUMENTS

| | | | |
|---|---|---|---|
| 5,675,819 A | 10/1997 | Schuetze | |
| 5,867,799 A | 2/1999 | Lang et al. | |
| 5,931,907 A * | 8/1999 | Davies et al. | 709/218 |
| 5,933,827 A * | 8/1999 | Cole et al. | 707/10 |
| 5,937,400 A | 8/1999 | Au | |
| 5,966,686 A | 10/1999 | Heidorn et al. | |
| 6,108,619 A * | 8/2000 | Carter et al. | 704/9 |
| 6,157,935 A * | 12/2000 | Tran et al. | 715/202 |
| 6,199,067 B1 * | 3/2001 | Geller | 707/10 |
| 6,310,889 B1 * | 10/2001 | Parsons et al. | 370/466 |
| 6,405,199 B1 | 6/2002 | Carter et al. | |
| 6,629,149 B1 * | 9/2003 | Fraser et al. | 709/245 |
| 6,671,682 B1 * | 12/2003 | Nolte et al. | 707/5 |
| 6,691,106 B1 * | 2/2004 | Sathyanarayan | 707/3 |
| 6,804,684 B2 | 10/2004 | Stubler et al. | |
| 6,813,616 B2 | 11/2004 | Simpson et al. | |
| 7,213,032 B2 * | 5/2007 | Mascarenhas | 707/104.1 |
| 2002/0116337 A1 * | 8/2002 | Peled et al. | 705/51 |
| 2002/0154124 A1 * | 10/2002 | Han | 345/473 |
| 2005/0034055 A1 * | 2/2005 | Rangan et al. | 715/500 |
| 2006/0020593 A1 | 1/2006 | Ramsaier et al. | |

FOREIGN PATENT DOCUMENTS

WO  WO-9939281  8/1999
WO  WO-0175724 A1  10/2001

OTHER PUBLICATIONS

"European Application No. 06121855.8 Extended Search Report", May 16, 2007, 7 pgs.
Hitchens, Michael, et al., "Secure Identity Management for Pseudo-Anonymous Service Access", *Lecture Notes in Computer Science*, vol. 3450/2005, (2005),48-55.
"European Application No. 06121855.8 Summons to attend oral proceedings", (Mar. 11, 2008),12 pgs.

* cited by examiner

*Primary Examiner*—James Trujillo
*Assistant Examiner*—Marc Somers
(74) *Attorney, Agent, or Firm*—Schwegman, Lundberg & Woessner, P.A.

(57) ABSTRACT

Semantic identities are provided. A semantic identity is created for an agent. The semantic identity is associated with one or more categories and the categories are associated with interests. The semantic identity mines a network for information that relates to the one or more categories or the interests and packages the information for the agent's subsequent review and consumption.

18 Claims, 3 Drawing Sheets

SEMANTIC IDENTITIES

FIELD

The invention relates generally to data processing within a networked environment and more particularly to the creation, maintenance, and use of semantic identities that process within that networked environment.

BACKGROUND

With the advent of the Internet and broadband access, which has become more and more prevalent, consumers and entities now have a plethora of information, which is seemingly just a keystroke or click away. This has been extremely beneficial for enriching the affairs (e.g., intellectually, personally, financially, etc.) of consumers and entities. These developments have also improved the efficiency of the consumers and entities.

However, the benefits also have a number of drawbacks. For instance, because there is so much information available finding relevant information can be a trying and time-consuming experience when the relevant information is buried within a sea of irrelevant information. Some search and retrieval services have made significant improvements in this area of information relevancy, but these services still often require the affirmative action of a user to construct a proper search. Without a well constructed search and the affirmative action of the user, the search and retrieval services provided little additional benefit to the user.

Another drawback is that the users often have to identify themselves while searching for desired information over the Internet. The problem with this is that there are numerous automated services on the Internet that are attempting to profile users and gather information on them. Some of this profiling is considered legal, such as when it is being done for lawful marketing purposes, and some of this profiling is considered illegal, such as when it is being done to perform electronic identity theft of a user. In either case, users are not comfortable with electronic profiling and many consider it to be an invasion of their privacy, even if such profiling is considered lawful.

In still another drawback, most consumers and entities lead very busy existences with a variety of obligations, commitments, and interests. In many cases, users do not have the time to manually and continuously search the Internet for information that interests them and their affairs. Moreover, most users do not have the luxury of having the necessary resources to hire outside agencies to regularly and continually mine the Internet on their behalf for all their interests for purposes of making their existences a little more enriched and a little more efficient.

SUMMARY

In various embodiments, semantic identities are presented. More specifically, and in an embodiment, a method for creating and maintaining a semantic identity on behalf of an agent is provided. One or more categories are associated with an agent and a semantic identity is generated for the agent. Further, the categories are associated with the semantic identity. Additionally, interests of the agent are associated with the one or more categories and are assigned to the semantic identity.

In still more embodiments, semantic identities of agents are used for processing actions over network within their semantic spaces for purposes of gathering related information that interests the agents and for purposes of identifying associations or relationships to other related semantic identities.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "agent" may be viewed as a true persona of principal. That is, an agent is a primary identity for a principal, such that the agent is permitted to manage the other identities that may be associated with principal and create new identities for the agent. Any particular assumed identity for an agent is dependent upon contexts and perhaps directions of the agent.

An "identity" is something that is formulated from a one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc. As more and more identifiers are accumulated, a confidence in a particular identity grows stronger and stronger.

A "semantic identity" is a special type of identity that the agent can assume. Automated resources, such as services, may process the semantic identity over a network on behalf of the agent to which the semantic identity is associated. The semantic identity is confined or circumscribed to defined categories and interests identified by the agent. That is, the services that process the semantic identity over a network operate within a circumscribed semantic space of that network, where the semantic space is defined by the categories and the interests of the semantic identity.

In some cases, the semantic services may also automatically update, modify, delete, and/or add to the categories and/or interests, which are associated with the semantic identity. The services of the semantic identity use the semantic identity for mining the network within semantic identity's defined semantic space for purposes of identifying related information and/or relationships that comport with the defined categories and interests of the semantic identity. In some cases, the agent may also manually process transactions over the network as the semantic identity without the benefit of the automated semantic services.

In an embodiment, the true persona of the agent and the other identities of the agent, including the semantic identity and the true persona of the agent, may be created and managed by an identity service. Examples of some identity services, which may be modified with the teachings presented herein, may be found in U.S. Pat. No. 7,299,493, entitled "Techniques for Dynamically Establishing and Managing Authentication and Trust Relationships," issued on Nov. 20, 2007; U.S. Publication No. US-2005-0171872-A1, entitled "Techniques for Establishing and Managing a Distributed Credential Store," filed Jan. 29, 2004 and published on Aug. 4, 2005; and U.S. Pat. No. 7,316,027, entitled "Techniques for Dynamically Establishing and Managing Trust Relationships," issued on Jan. 1, 2008. The disclosures of which are incorporated by reference herein.

In some embodiments, the areas of interest for an agent, for a category, and/or for a semantic identity are constructed as semantic abstracts and represented in a formal manner. Examples of such techniques include U.S. Pat. No. 7,197,451, entitled "A Method and Mechanism for the Creation, Maintenance and Comparison of Semantic Abstracts," issued on May 27, 2007; U.S. Pat. No. 7,152,031, entitled "Construction, Manipulation, and Comparison of a Multi-Dimensional Semantic Space," issued on Dec. 19, 2006; and U.S. Pat. No. 6,108,619, entitled "Method and Apparatus for Semantic Characterization of General Content Streams and Repositories," issued on Aug. 22, 2000. The disclosures of which are incorporated by reference herein.

Various embodiments of this invention can be implemented in existing network architectures. For example, in some embodiments, the techniques presented herein are implemented in whole or in part in the Novell® network and proxy server products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

Figure 1:
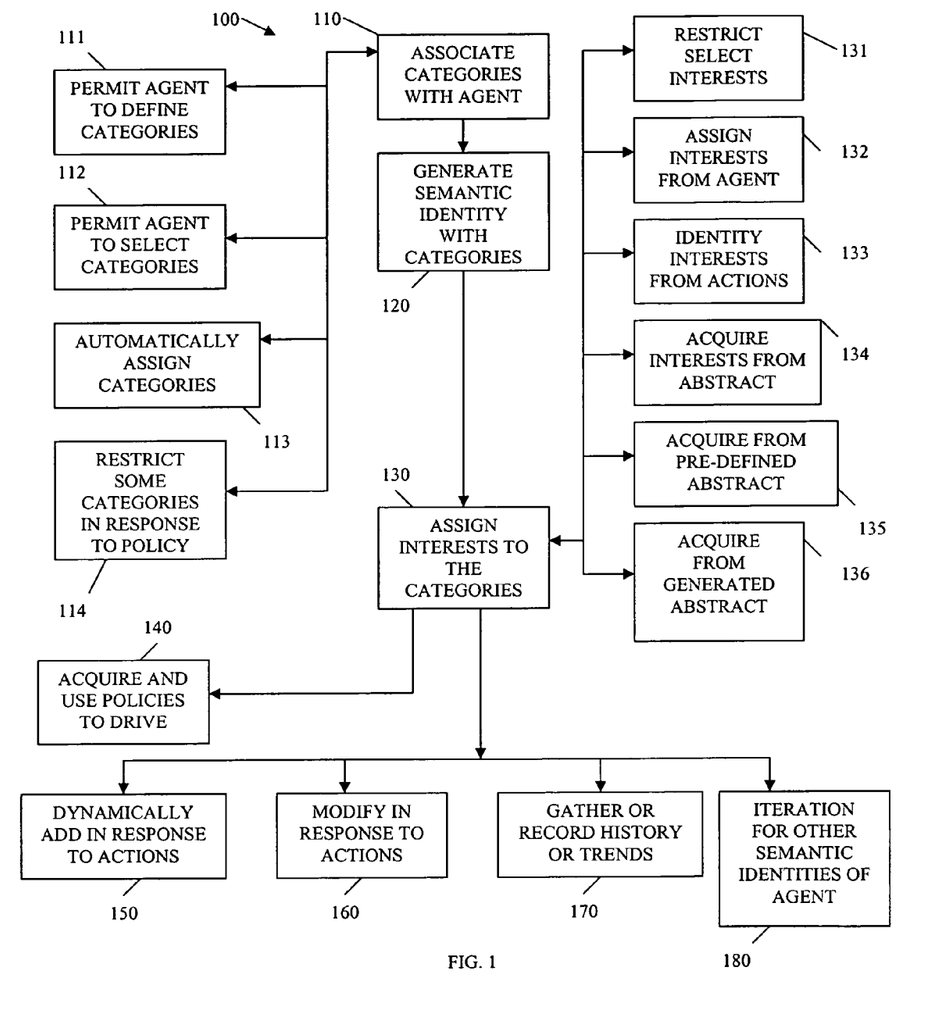
FIG. 1 is a diagram of a method for creating and maintaining a semantic identity, according to an example embodiment.

FIG. 1 is a diagram of a method 100 for creating and maintaining a semantic identity, according to an example embodiment. The method 100 (hereinafter "semantic identity service") is implemented in a machine-accessible and readable medium. The semantic identity service is operational over and processes within a network. The network may be wired, wireless, or a combination of wired and wireless. In an embodiment, the semantic identity service is a modified version of the identity services discussed and incorporated by reference above.

Initially, an agent has a true persona or identity that the agent uses for creating and using other identities associated with the agent. Any particular identity for the agent is resolved based on the context of a transaction associated with the agent or based on an affirmative declaration or action of the agent to use a particular one of the identities.

For example, an agent may have one or more "employee" identities (e.g. one that is well known such as "srcarter," and one that is associated with a pseudonym to protect the employer or corporate identity). Another identity for the agent may be "fiction writer," such that the agent desires an identity associated with an interest in fiction writing. Again, this may be a well-known identity or a pseudonym. The same example agent can still have other identities associated with other aspects of the agent's existence, such as "inventor," "photographer," "rugby player," etc.

These identities may be managed by different aspects of a more global identity service to which the semantic identity service is associated or a part of, but this does not have to be the case. That is, a plurality of different services may manage different identities for the agent or a same identity service may manage selective groupings of some agent identities or all of the agent identities. The semantic identities associated with the agent are created and managed on behalf of the agent by the semantic identity service. Again, the semantic identity service may be a stand-alone service or integrated within a more global identity service. Examples of centralized and global identity services were provided and incorporated by reference above.

At 110, the semantic identity service associates categories for a semantic identity that the agent desires to have generated. The categories represent topics or subjects. A collection of one or more categories may be viewed as a semantic space that is to be associated with the semantic identity being generated by the semantic identity service.

It should be noted that each of the agent's other identities that are not associated with the semantic identity may also have one or more categories associated with it. Thus, in the example provided above the employee identity may include the name of the corporation or business as a category and may also include a type of business, such as and by way of example only "software services."

The one or more categories may be associated with the agent in a variety of manners. For example, at 111, the agent may define a custom category that is to be associated with the desired semantic identity being generated. Alternatively, at 112, the agent may select categories from a listing of available categories supplied by the semantic identity service or another category or another identity service. In still other embodiments, at 113, the semantic identity service may automatically assign one or more categories in response to certain supplied other categories of the agent. That is, the agent may select a category associated with photography, and that category may be closely aligned or associated with imagery or digital photographs, such that the semantic identity service automatically assigns these other related categories in response to an initial assignment of the photography category. Whether or not and to what extent the semantic identity service automatically generates and associates other additional and related categories can be driven by profiles, policies, and/or configurations of the agent, the categories themselves, or the semantic identity service.

In some cases, the associated categories may be restricted based on policy. That is, select ones of the associated categories may include a policy that states other ones of the categories cannot be associated with one another for a same semantic identity that is being generated. For example, a category associated with an employer may have a policy that restricts categories associated with gambling or other nefarious subject matters. Thus, the semantic identity service serves as a watchdog to prevent certain groupings of categories when such groupings conflict with one another based on policy. Also, the policy may be global associated with the agent and does not have to just be associated with a category. In this manner, an agent may be restricted from adding any nefarious categories irrespective of existing categories that are to be associated with the semantic identity that is being generated on behalf of the agent.

Any policies used by the semantic identity service may also be used to determine attributes that are to be assigned to the semantic identity that is being generated. For example, any category that is not associated with an employer category may restrict an attribute associated with the agent's employee number from being assigned for use with non employer category.

At 120, the semantic identity service generates a new semantic identity for the requesting agent in response to the associated and assembled category assignments. The semantic identity may include an identifier that may be used by the agent or by an automated service to mine a network within a defined semantic space that is representative of the assigned categories. An example of such an automated service is provided below with the description of FIG. 2.

In an embodiment, the generated semantic identity may also include a semantic specification represented as metadata. The metadata may include policies, identifiers for the categories, interests (as discussed below), identifiers for automated services, and other information that assists in using the semantic identity within its defined semantic space.

At 130, the semantic identity service augments the semantic identity that was generated with a number of interests. The interests are limitations or more specific areas or sub-categories within a particular one of the assigned categories that further reduce the semantic space. For example, a category associated with photography may have an interest that is defined as "nature photography" or even more specific such as "sunset photography." A single category may include a plurality of more limiting and defining interests.

Acquisition of the interests for each assigned category can occur in a variety of manners. Furthermore, these manners are not mutually exclusive of one another. In other words, multiple techniques may be used to acquire interests for each of the assigned categories.

Additionally, at 131, some selected interests that are perhaps manually identified by the agent for a given category may be restricted and forbidden from being associated with the given category. Again, these types of restriction may be dictated by policy associated with the given category or more globally associated with the agent. For example, a "photography" category may restrict the addition of an interest in "nude photography."

In one technique for assigning interests to the generated semantic identity, at 132, the semantic identity service may receive manually assignments for particular ones of the interests from the agent. In another technique, at 133, the semantic identity service may receive and automatically assign particular interests in response to actions performed by the agent or an automated service that mines the network using the semantic identity within its semantic space.

In still another technique, at 134, the semantic identity service may acquire some or all of the interests assigned to the semantic identity from a semantic abstract that represents the interests. Examples of semantic abstracts and services that create and manage semantic abstracts were provided and incorporated by reference above. At 135, the semantic abstract may be selected in response to a particular category from a list of predefined semantic abstracts associated with that category. In an alternative technique, at 136, the semantic abstract may be custom-generated for the agent or for a category and received from a semantic abstract service.

As an example application of the semantic abstracts consider the following scenarios. An agent selects from a semantic abstract service one or more semantic abstracts that are indicative of the agent's interests in a given category. The selection process may be made via manual selection from lists of available and predefined, as discussed with 135, or the desired abstract may be custom generated, as discussed with 136, when the agent supplies an agent acquired or developed abstract to the semantic abstract service to use as a template or model.

It should also be noted that in embodiments where semantic abstracts are used to define one or more of the interests that the assignment of these abstracts to the generated semantic identity may also be restricted based on policy. The policy may be associated with the abstracts, the categories, the interests, and/or the agent.

Thus, at 140, the semantic identity service may use a variety of policies to drive and direct the assignment and association of the categories, the interests, and/or any used abstracts as they related to the generated semantic identity. Additionally, the policies may be more globally associated with operations and uses of the semantic identity and/or the agent.

According to an embodiment, at 150, the semantic identity service may dynamically add one or more additional categories, interests, and/or any abstracts to the semantic specification of the semantic identity in response to actions or the life-cycle of the semantic identity. Thus, as the semantic identity mines the network during its life-cycle via an automated service or via manual direction of the agent, the agent or the service may focus on more particular areas of interests or even add new categories. These additions may be dynamically made to the semantic specification of the semantic identity by the semantic identity service.

In a similar manner, at 160, categories, interests, and/or abstracts may be deleted or honed during the life-cycle of the semantic identity. This permits the semantic space associated with the semantic identity to become richer, more refined, more focused, and more accurate over the course of time and thus makes the semantic identity more valuable to the agent.

Thus, in some embodiments, the semantic identity becomes progressively enriched and the evolving categories, interests, and/or abstracts provide valuable insight into the sphere of knowledge and interests of the agent. Moreover, any semantic abstracts can be represented formally as a collection of semantic vectors or as an aggregation of the collection of semantic vectors (or as any combination of vectors or abstracts), such that what is resolved in the end is a semantic identity that specifies one or more locations in a semantic space and an indication on how close those semantic abstracts must be in order to be considered a semantic match with other semantic identities. This can permit matching and establishing dynamic semantic relationships with other semantic identities and can permit more focused mining of the network, such as the Internet, for desired information within the evolved and refined semantic space that develops over the life-cycle of the semantic identity.

In yet another embodiment, at 170, the semantic identity service may gather or record, via an automated service, the history of network transactions performed by the semantic identity over the network. Additionally, the history may be analyzed in automated fashions to establish trends with the semantic identity.

For example, if the history of additions and deletions for any semantic abstracts being used with the semantic identity is maintained, then several points in the evolving semantic space, which is represented by the semantic abstracts, can be identified for establish trends vis-à-vis some predefined thresholds or measurements of progress, such as time, statistics, etc. The trends can provide further semantic measures between multiple other semantic identities to indicate when two or more semantic identities are converging within the same points of the semantic space or when two or more semantic identities are diverging from common points or categories within the semantic space.

In an embodiment, at 180, the semantic identity service may be used to create and manage one or more additional semantic identities for any given agent. Thus, the processing of the semantic identity service can re-iterate or operate concurrently with itself to provide and manage multiple semantic identities for a single agent. Additionally, the processing of the semantic identity service can manage semantic identities for multiple different agents.

Figure 2:
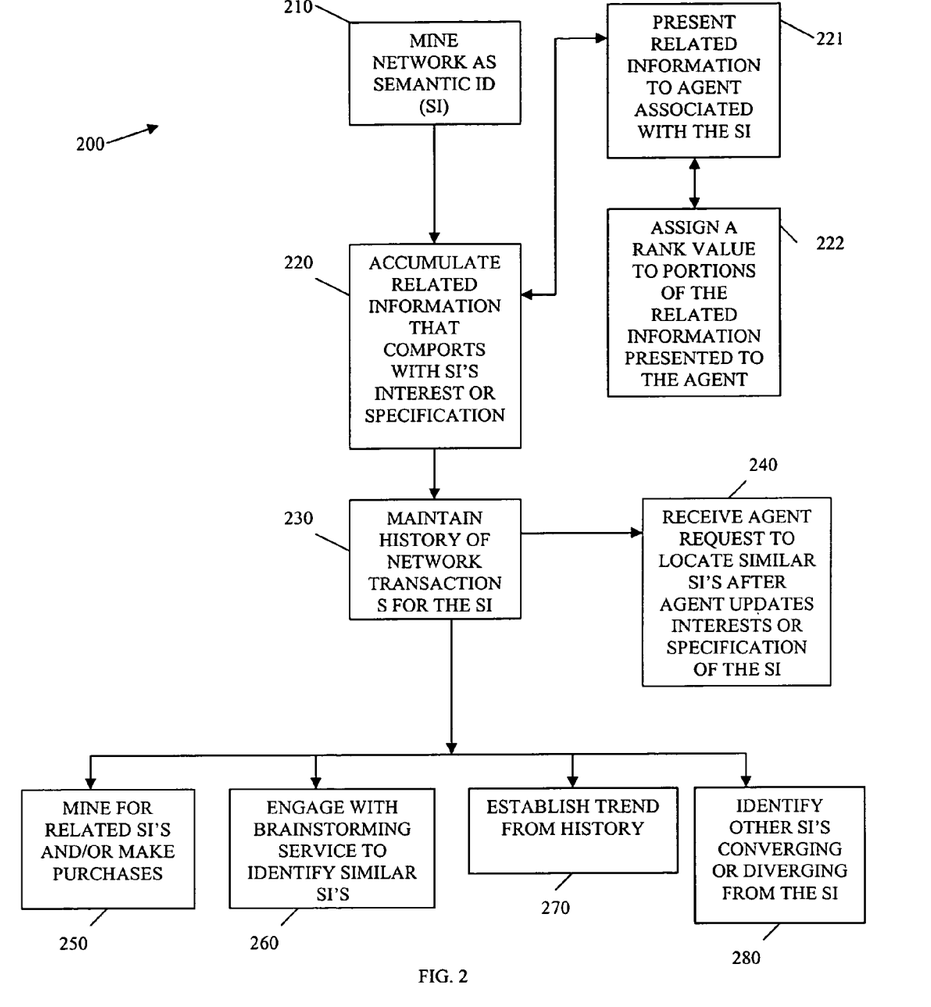
FIG. 2 is a diagram of method for processing a semantic identity over a network, according to an example embodiment.

FIG. 2 is a diagram of method 200 for processing a semantic identity over a network, according to an example embodiment. The method 200 (hereinafter "semantic processing service" is implemented in a machine-accessible and readable medium and is operational over a network. The network may be wired, wireless, or a combination of wired and wireless. In an embodiment, the semantic processing service interacts with the semantic identity service represented by the method 100 of FIG. 1 to process network transactions over a network as a semantic identity that was created and is managed by the semantic identity service.

The semantic processing service is an automated service that mines the network within the semantic space defined by the semantic identity or its associated semantic specification. In some cases, the semantic processing service may also interact manually or receive direction from an agent that is associated with the semantic identity that the semantic processing service is processing over the network.

Initially, the semantic processing service is initiated manually at the direction of the agent or automatically at different intervals or periods of time based on its configuration. For example, an agent may start the semantic processing service or the semantic processing service may start automatically at predefined dates or times of a given day. In a similar manner, configurations may dictate for how long the semantic processing service processes over the network or when the semantic processing service determines when to suspend a given cycle of processing. Policies may also be used to drive when and for how long the semantic processing service operates over the network.

Once initiated for a given semantic identity, at 210, the semantic processing service mines the network as the semantic identity. Thus, to onlookers or services of the network, the semantic processing service appears to be the semantic identity and not the agent that is associated with the semantic identity. The semantic processing service mines the network as the semantic identity for information, goods, services, and/or other semantic identities with similar interests or semantic abstracts as the semantic identity.

Accordingly, at 220, the semantic processing service accumulates related information that comports with the semantic identity's interests or the semantic specification of the semantic identity. What is determined to comport and not comport can be driven by thresholds and scores. That is, as information is encountered it can be scored based on heuristics to obtain a value, and a threshold may dictate if that value is to be considered relevant and thus be said to comport, or is to be considered irrelevant and thus said not to comport. The heuristics and/or threshold may be configured by the agent. The configuration may dictate the precision, recall, and overall accuracy of the information mined from the network by the semantic processing service.

In an embodiment, at 221, the semantic processing service may package and present the related information mined from the network to the agent at configurable intervals or on demand as soon as the information is acquired by the semantic processing service. In some cases, at 222, portions of the gathered information may be scored and receive a rank value. The rank value is used to organize and order how portions of the gathered information are presented to the agent for review and consumption. Information presentation and packaging may be done in a variety of formats, such as via populated World-Wide Web (WWW) pages, via reports in spreadsheets or word processing documents, via email, instant messaging (IM), etc.

In some embodiments, the semantic processing service may create its own summaries or extracts of the related information to produce a condensed format that is more easily digested by the agent. That is, selected portions of a whole document may be extracted and packaged for presentation to the agent. A link to the complete document may be also supplied, such that if the agent feels the extracted information is particularly relevant to the agent, the agent can access the link and acquire the whole document for review.

At 230, the semantic processing service may also maintain a history of network transactions performed by the semantic processing service as the semantic identity and any of its interactions with the agent. This history may be submitted to a semantic identity service, such as the one represented by the method 100 of FIG. 1, and used by that semantic identity service to continually evolve and update the semantic specification of the semantic identity, update interests, update categories, and/or update semantic abstracts.

In an embodiment, at 240, the agent may interact with the semantic processing service to provide it direction. For example, the semantic processing service may receive a direct request from the agent to locate similar semantic identities or similar information after the agent updates its interests, categories, and/or semantic abstracts for its semantic identity. For example, an agent may have just published a dissertation and added that to an existing semantic abstract or used the dissertation to create a new semantic abstract. The agent may then ask the semantic processing service to find similar semantic identities or similar information related to this update on the network, within the revised semantic space.

According to an embodiment, at 250, the semantic processing service may also mine the network within the semantic space defined by the semantic specification of the semantic identity for related semantic identities with similar activity within the same semantic space. In addition, the semantic processing service may be used to automatically purchase and order goods or services that are desired by the agent and located within the semantic space. This latter type of processing may require some funding attributes, such as a credit card or debit card that the semantic processing service can use.

As an example application of the semantic processing service, which seeks to locate similar or related semantic identities within the same semantic space of the network, consider a corporate entity that is the agent and uses the semantic identity. The corporate entity can use the semantic processing service to locate competitors or potential partners within their existing business space or within a business space that they desire to enter. This can provide invaluable corporate intelligence to the corporate entity, which is not conventionally available.

In another embodiment, at 260, the semantic processing service may submit the semantic identity or engage itself in interactions with a brainstorming service. The goal of this service is to match semantic identities with one another to find semantic fits. Such activity may be useful to create on-line and virtual communities or groups having similar interests or semantic abstracts or may be used to match two agent with one another for a variety of desired purposes, such as business, finance, sport, hobbies, entertainment, scholastic, interpersonal, etc.

According to an embodiment, at 270, the semantic processing service may use the recorded history to establish and report its own derived trends to the agent. Examples of this were presented above with respect to the semantic identity service represented by the method 100 of FIG. 1. Again, at 280, the trends may identify where one or more semantic identities are converging with the semantic identity within the same or similar semantic space of the network or where one or more similar semantic identities are beginning to trend apart from the same or similar semantic space of the semantic identity.

Figure 3:
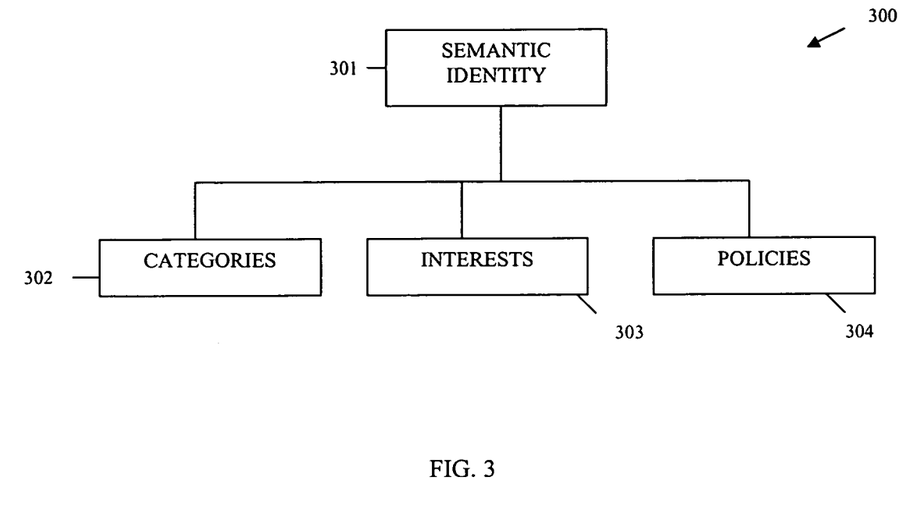
FIG. 3 is a diagram of a semantic identity system, according to an example embodiment.

FIG. 3 is a diagram of a semantic identity system 300, according to an example embodiment. The semantic identity system 300 is implemented in a machine-accessible and readable medium and is operational over a network. The network may be wired, wireless, or a combination of wired and wireless. In an embodiment, the semantic identity system 300 implements, among other things, the semantic identity service and the semantic processing service represented by the methods 100 and 200 of the FIGS. 1 and 2, respectively.

The semantic identity system 300 includes a semantic identity 301, one or more categories 302 (hereinafter "categories"), and interests 303. In some embodiments, the semantic identity system 300 may also include policies 304. Each of these will now be discussed in turn.

The semantic identity 301 is created, populated, and managed by a semantic identity service, such as the one discussed above with the method 100 of FIG. 1. Additionally, the agent to whom the semantic identity 301 is associated may actively and periodically participate in creating, populating, and managing the semantic identity 301. This agent participation was also discussed and presented above with the discussions of FIGS. 1 and 2.

The categories 302 are assigned to the semantic identity 301 during its creation and during the life-cycle of the semantic identity. Examples of how categories 302 are assigned and attributed to the semantic identity were also presented above with the discussions of FIGS. 1 and 2. The categories 302 assist in defining the semantic space within a network that is to be associated with the semantic identity 301.

The interests 303 are also assigned to the categories 302. Examples of how interests are acquired and assigned were presented above with the discussions of FIGS. 1 and 2. Similar to the categories 302, the interests 303 further refine the semantic space of the semantic identity 301. The categories 302 may be dynamically added, removed, or modified during the life-cycle of the semantic identity 301.

It should also be noted that in some embodiments, the interests 303 are represented and defined within semantic abstracts. These abstracts were discussed above with the FIGS. 1 and 2 and may be selected based on a given one of the categories 302 or may be custom-generated based on information supplied to a semantic abstract service. Abstracts provide a convenient and formal mechanism for defining and representing the interests 303.

Furthermore, the agent or an automated semantic processing service associated with the semantic identity 301 may manually modify or augment the interests 303 and submit for changes to the interests 303 or to the semantic abstracts to which the interests 303 are associated with. To do this, the agent may, in some cases, manually inspect information supplied or mined from the network by an automated semantic processing service or may acquire information by the agent's own actions and provide a weight to the information or highlight different portions of the information to refocus or emphasize particular updates to the interests 303 of the semantic identity 301.

In an embodiment, the semantic identity system 300 also includes policies 304. The policies 304 may drive the creation of the semantic identity 301 and its operation. Policies 304 may be associated with the agent, the semantic identity 301, the categories 302, and/or the interests 303. The policies 304 may be consumed and processed by a semantic identity service and/or an automated semantic processing service. Examples of policies 304 and their usages were discussed in detail above with FIGS. 1 and 2.

During operation of the semantic identity system 300, a semantic identity service, and automated semantic processing service, and an agent assist and cooperate with one another for purposes of creating, populating, managing, and refining the semantic identity 301. In this sense, the components 301-304 of the semantic identity system 300 may be viewed as a semantic specification for the semantic identity 301.

Over the life-cycle of the semantic identity 301, network transactions are processed within a semantic space of the network circumscribed by the categories 302 and the interests 303. These categories 302 and interests 303 evolve and are modified during the life-cycle to enrich, refine, and focus the semantic space that the agent desires for the semantic identity 301.

According to an embodiment, the semantic identity system 300 may be consumed to perform a number of network transactions for purposes of determining or identifying a configurable semantic distance within the defined semantic space of the network that exists between the semantic identity 301 and its interests 303 and other semantic identities and their interests. This provides novel and automated mechanisms for matching related semantic identities to the semantic identity 301.

Figure 4:
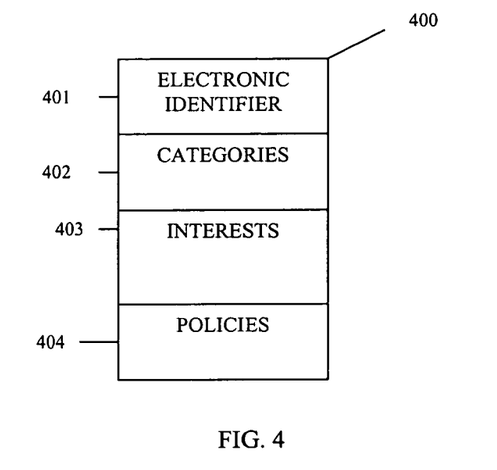
FIG. 4 is a diagram of a data structure implemented in a machine-accessible medium representing a semantic identity, according to an example embodiment.

FIG. 4 is a diagram of a data structure 400 implemented in a machine-accessible medium representing a semantic identity, according to an example embodiment. The data structure is implemented in a machine-accessible and readable medium and is accessed and processed over a network. The network may be wired, wireless, or a combination of wired and wireless.

In an embodiment, the data structure 400 is initially populated and subsequently managed by a semantic identity service, such as the one represented by the method 100 of FIG. 1. Additionally, in some embodiments, the data structure 400 is used by the semantic processing service as it processes network transactions as a semantic identity over the network, such as the semantic processing service represented by the method 200 of FIG. 2. In still more embodiments, the data structure 400 is created, managed, and used by the semantic identity system 300 presented in FIG. 3.

The data structure 400 includes an electronic identifier 401, one or more categories 402 (hereinafter "categories"), and interests 403. In some embodiments, the data structure 400 may also include policies 404. Logically, the data structure 400 may be viewed as a semantic identity and its corresponding semantic specification. Each component of the data structure 400 will now be discussed in turn.

The electronic identifier 401 provides a mechanism for a semantic identity to identify itself over a network. Other identifiers may be used to assure this identification to services of the network, such as passwords, signatures, certificates, etc. The electronic identifier 401 may be automatically generated and populated to the data structure 400 by an agent to which it is associated or by a semantic identity service that creates and manages a semantic identity on behalf of the agent. Moreover, the electronic identifier 401 is used by an automated semantic processing service and/or the agent to masquerade on the network as the semantic identity.

The categories 402 limit the semantic space within which the semantic identity will process over the network when using the electronic identifier 401. Categories 402 are assigned and populated to the data structure 400 by a semantic identity service and/or the agent. The categories 402 begin to restrict the semantic space for the semantic identity over the network. Moreover, categories 402 are dynamic and evolve within the data structure 400 over the life-cycle of the semantic identity.

The interests 403 further limit the semantic space within which the semantic identity will process over the network when using the electronic identifier 401 within a given one of the categories 402. The interests 403 are also dynamic and evolve within the data structure 400 over the life-cycle of the semantic identity. The interests 403 may be assigned, modified, deleted, and/or added to the data structure 400 by a semantic identity service, the agent, or an automated semantic processing service. In some embodiments, the interests 403 may also be represented as a semantic abstract or as one or more semantic vectors. Thus, the data structure 400 may include other sub-data structures within it.

In an embodiment, the data structure 400 may also include policies 404. The policies 404 dictate proper associations between multiple categories 402 and between interests 403 and their assigned categories 402. Some policies 404 may also be more globally associated with the data structure 400 as a whole and/or with the agent to which the data structure 400 is associated. The policies 404 are consumed and assist in driving the semantic identity service and/or the automated semantic processing service.

The data structure 400 is populated, modified, managed, augmented, and consulted within a machine-accessible medium by the semantic identity service, such as the one depicted in method 100 of FIG. 1, by an automated semantic processing service, such as the one depicted in the method 200 of FIG. 2, and by the agent to which the data structure 400 is associated and being used to establish a semantic specification for a semantic identity of the agent.

Thus, the data structure 400 evolves over the life-cycle of the semantic identity to refine the semantic space of the semantic identity within the network and to cull or mine the network for desired information, goods, services, and/or relationships that are operating within the same semantic space. Additionally, other data related to the activities of the semantic identity may be collected and associated with the data structure 400, such as history and trends.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
   assigning interests of an agent, the interests are associated with one or more categories, the agent represents a primary identity for a principal and a principal is a resource, the primary identity is a true persona of the agent;
   associating the one or more categories with the agent;
   generating a semantic identity for the agent that is associated with the one or more categories;
   subsequently using the semantic identity, by the agent to perform network transactions as the semantic identity, and the semantic identity and the primary identity are formulated from identifiers and secrets to provide a statement of roles and permissions that a particular identity has in relation to particular resources that are accessed in the network transactions;
   mining the network with the semantic identity and presenting the mining process to network onlookers as coming from the semantic identity and not the agent, the network is mined within a defined semantic space that is representative of the one or more categories; and
   maintaining anonymity of the primary identity during the mining of the network, the semantic identity uses a password for the semantic identity to assure services of the network that identification is for the semantic identity and not the agent.

2. The method of claim 1 further comprising, acquiring policies that at least one of dictate permissible and impermissible actions and that dictate permissible and impermissible associations of the semantic identity.

3. The method of claim 1, wherein associating further includes at least one of:
   permitting the agent to define a number of the one or more categories;
   permitting the agent to select a number of the one or more categories from an available list of predefined categories; and
   automatically assigning a number of the one or more categories in response to other identified ones of the one or more categories.

4. The method of claim 1, wherein associating further includes restricting select categories from being associated with the agent in response to policy associated with other identified ones of the one or more categories or in response to policy associated with the agent.

5. The method of claim 1, wherein assigning further includes at least one of:
   restricting select interests from being assigned to the semantic identity in response to policy;
   assigning a number of the interests via affirmative declaration of the agent or via information supplied as a template from the agent;
   automatically identifying a number of the interests in response to actions of the semantic identity; and
   acquiring a number of the interests from a semantic abstract.

6. The method of claim 1, wherein assigning further includes at least one of:
   acquiring a number of the interests from a pre-defined semantic abstract selected from a service; and
   acquiring a number of the interests from a custom-generated semantic abstract received from the service.

7. The method of claim 1 further comprising, dynamically modifying the one or more categories or interests in response to actions of the semantic identity as the semantic identity performs actions over a network.

8. The method of claim 1 further comprising, dynamically adding a new category or a new interest to the semantic identity in response to actions of the semantic identity over a network.

9. The method of claim 1 further comprising, gathering and recording history or trends associated with the semantic identity in response to actions of the semantic identity over a network.

10. The method of claim 1 further comprising, iterating the method for one or more additional semantic identities requested by the agent.

11. A machine-implemented method, comprising:
   mining a network for information as a semantic identity to perform network transactions against network resources on behalf of a principal associated with the semantic identity, the principal includes a primary identity that is not the semantic identity, the primary identity is a true persona for the principal, and the network is mined for interests defined for the semantic identity;
   accumulating related information that comports with the interests of the semantic identity defined in a semantic specification associated with the semantic identity, and the semantic identity is formulated from identifiers and secrets to provide a statement of roles and permissions that the semantic identity has in relation to particular resources that are accessed in the network transactions;
   mining the network as the semantic identity and presenting the mining process to network onlookers as coming from the semantic identity and not the agent, again the network is mined for the interests; and
   maintaining anonymity of the primary identity during the mining of the network and the semantic identity uses a signature for the semantic identity to assure the network resources that identification is for the semantic identity and not the agent.

12. The method of claim 11 further comprising:
   mining the network for other semantic identities that comport with one or more of the interests of the semantic identity; and
   making a purchase over the network as one of the network transactions.

13. The method of claim 11 further comprising, engaging the semantic identity with a brainstorming service to pair the semantic identity with one or more similar semantic identities that comport with one or more of the interests or that comport with other aspects of the semantic specification.

14. The method of claim 11 further comprising, receiving a request from an agent associated with the semantic identity to locate other similar semantic identities after the agent augments or updates the interests or the semantic specification, wherein the agent represents a primary identity for a principal and a principal is a resource.

15. The method of claim 11 further comprising at least one of:
   maintaining a history of network transactions for the semantic identity; and
   establishing a trend from the history for the semantic identity.

16. The method of claim 15 further comprising, identifying other semantic identities that appear to be converging and/or diverging from the semantic identity in response to the trend.

17. The method of claim 11, wherein accumulating further includes presenting the related information to an agent associated with the semantic identity, wherein the agent represents a primary identity for a principal and a principal is a resource.

18. The method of claim 17 further comprising, assigning a rank value to portions of the related information, wherein higher rank values are associated with a more desirable portions of the related information than lower rank values, which are associated with less desirable portions of the related information, and wherein the higher and lower rank values may be used to modify the semantic specification.

* * * * *